(12) United States Patent
Slutsky et al.

(10) Patent No.: US 11,748,936 B2
(45) Date of Patent: Sep. 5, 2023

(54) USING EPIPOLAR REPROJECTION FOR VIRTUAL VIEW PERSPECTIVE CHANGE

(71) Applicant: GM GLOBAL TECHNOLOGY OPERATIONS LLC, Detroit, MI (US)

(72) Inventors: Michael Slutsky, Kfar Saba (IL); Albert Shalumov, Petah Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 303 days.

(21) Appl. No.: 17/189,877

(22) Filed: Mar. 2, 2021

(65) Prior Publication Data
US 2022/0284660 A1    Sep. 8, 2022

(51) Int. Cl.
*G06T 15/20* (2011.01)
*G06T 7/70* (2017.01)
*H04N 7/18* (2006.01)
*G06T 7/50* (2017.01)

(52) U.S. Cl.
CPC ............... *G06T 15/20* (2013.01); *G06T 7/50* (2017.01); *G06T 7/70* (2017.01); *H04N 7/183* (2013.01); *G06T 2207/30244* (2013.01)

(58) Field of Classification Search
CPC .. G06T 15/20; G06T 7/50; G06T 7/70; G06T 2207/30244; G06T 7/55; G06T 2207/10016; G06T 2207/10028; G06T 2207/30252; G06T 7/75; H04N 7/183
See application file for complete search history.

(56) References Cited

U.S. PATENT DOCUMENTS

| | | | | |
|---|---|---|---|---|
| 11,378,523 | B1 * | 7/2022 | Moor | G01N 21/958 |
| 2013/0342671 | A1 * | 12/2013 | Hummel | G06V 40/107 |
| | | | | 348/77 |
| 2015/0279016 | A1 * | 10/2015 | Kim | G06T 7/521 |
| | | | | 382/154 |
| 2019/0139297 | A1 * | 5/2019 | Chen | G06T 19/20 |
| 2020/0357128 | A1 * | 11/2020 | McCombe | G06T 7/73 |

* cited by examiner

*Primary Examiner* — Said Broome
*Assistant Examiner* — Andrew Shin
(74) *Attorney, Agent, or Firm* — Lorenz & Kopf LLP (57) ABSTRACT

Systems and methods for generating a virtual view of a virtual camera based on an input scene are described. A capturing device typically includes a physical camera and a depth sensor and captures an input scene. A controller determines an actual pose of the capturing device and a desired pose of the virtual camera for showing the virtual view. The controller defines an epipolar geometry between the actual pose of the capturing device and the desired pose of the virtual camera. The controller generates an output image for the virtual camera based on an epipolar relation between the actual pose of the capturing device, the input scene, and the desired pose of the virtual camera.

20 Claims, 4 Drawing Sheets

USING EPIPOLAR REPROJECTION FOR VIRTUAL VIEW PERSPECTIVE CHANGE

TECHNICAL FIELD

The technical field generally relates to generating a virtual view based on captured image data. Particularly, the description relates to virtual view perspective change. More particularly, the description relates to systems and methods for generating a virtual view of a virtual camera based on an input scene captured by a capturing device that includes a physical camera with a co-located or spatially separated depth sensor.

Modern vehicles are typically equipped with one or more optical cameras that are configured to provide image data to an occupant of the vehicle. For example, the image data show a predetermined perspective of the vehicle's surroundings.

Under certain conditions, it might be desirable to change the perspective onto the image data provided by an optical camera. For such a purpose, so-called virtual cameras are used, and the image data captured by one or more physical cameras are modified to show the captured scenery from another desired perspective; the modified image data may be referred to as virtual scene or output image. The desired perspective onto the virtual scene may be changed in accordance with an occupant's wish. The virtual scene may be generated based on multiple images that are captured from different perspectives. However, merging image data from image sources that are located at different positions might cause undesired artifacts in the virtual image.

Accordingly, it is desirable to provide systems and methods for generating a virtual view of a scene captured by a physical camera with improved quality of the virtual scene, preserving the three-dimensional structure of the captured scene, and enabling to change the perspective from which the virtual scene is viewed Furthermore, other desirable features and characteristics of the present invention will become apparent from the subsequent detailed description and the appended claims, taken in conjunction with the accompanying drawings and the foregoing technical field and background.

SUMMARY

A method for generating a virtual view of a virtual camera based on an input scene is provided. In one embodiment, the method includes: capturing, by a capturing device, the input scene; determining, by a controller, an actual pose of the capturing device; determining, by the controller, a desired pose of the virtual camera for showing the virtual view; defining, by the controller, an epipolar geometry between the actual pose of the capturing device and the desired pose of the virtual camera; generating, by the controller, an output image for the virtual camera based on an epipolar relation between the actual pose of the capturing device, the input scene, and the desired pose of the virtual camera.

In one embodiment, the method includes capturing the input scene by a physical camera with a co-located depth sensor. The capturing, by the capturing device, the input scene includes capturing, by the physical camera, an input image; assigning, by the depth sensor, depth information to pixels of the input image; the determining, by the controller, the actual pose of the capturing device includes determining, by the controller, an actual pose of the physical camera; the defining, by the controller, the epipolar geometry between the actual pose of the capturing device and the desired pose of the virtual camera includes defining, by the controller, the epipolar geometry between the actual pose of the physical camera and the desired pose of the virtual camera; and the generating, by the controller, the output image for the virtual camera includes: resampling, by the controller, the depth information of the pixels of the input image in epipolar coordinates; identifying, by the controller, target pixels on an input epipolar line of the physical camera; generating, by the controller, a disparity map for one or more output epipolar lines of the virtual camera; and generating, by the controller, the output image based on the one or more output epipolar lines.

In one embodiment, the identifying, by the controller, target pixels on the input epipolar line of the physical camera includes minimizing, by the controller, a direction cost function to identify a target pixel.

In another embodiment, the minimizing, by the controller, the direction cost function to identify the target pixel is executed for each output pixel of each of the one or more output epipolar lines.

In another embodiment, the method further includes determining, by the controller, disparity along the output epipolar line for each output pixel by minimizing the direction cost function.

In another embodiment, the generating, by the controller, the output image based on the one or more output epipolar lines includes generating, by the controller, the output image by fetching pixels at the determined disparities.

In another embodiment, the direction cost function is defined as $$DC(\vec{p}, m) = 1 - \left( \frac{\vec{p} \cdot (\vec{R}[m] + \vec{T})}{\|\vec{R}[m] + \vec{T}\|} \right)^2$$

and the minimizing the direction cost function is done in accordance with $$\tilde{m}[\vec{p}] = \mathrm{argmin}[DC(\vec{p}, m)]$$

wherein:
DC is the direction cost function;
m is a pixel along the input epipolar line of the physical camera;
$\vec{p}$ is a unit vector from a virtual camera center pointing in a direction of a pixel on the output epipolar line of the virtual camera, for which a corresponding physical pixel m along the input epipolar line of the physical camera is to be identified;
$\vec{T}$ is a vector between a physical camera center and the virtual camera center;
$\vec{R}[m]$ is a 3D point location corresponding to pixel m;
$\tilde{m}[\vec{p}]$ is a physical pixel on the input epipolar line corresponding to a minimal value of DC for given $\vec{p}$.

In another embodiment, the assigning, by the depth sensor, depth information to pixels of the input image includes assigning, by the depth sensor, depth information to each pixel that is captured by the physical camera.

In another embodiment, the assigning, by the depth sensor, depth information to pixels of the input image includes determining by the depth sensor, a depth information of each pixel that is captured by the physical camera based on the input image.

In another embodiment, the method includes capturing the input scene by a physical camera and by a depth sensor that is spatially separated from the physical camera. The capturing, by the capturing device, the input scene includes capturing, by the physical camera, an input image, and capturing, by the depth sensor, depth data related to the input image; the determining, by the controller, the actual pose of the capturing device includes determining, by the controller, an actual pose of the physical camera, and determining, by the controller, an actual pose of the depth sensor; the defining, by the controller, the epipolar geometry between the actual pose of the capturing device and the desired pose of the virtual camera includes defining, by the controller, the epipolar geometry between the actual pose of the depth sensor and the desired pose of the virtual camera; and the generating, by the controller, the output image for the virtual camera includes: generating, by the controller, dense depth data for the desired pose of the virtual camera; projecting, by the controller, the dense depth data for the desired pose of the virtual camera onto the input image; and generating, by the controller, the output image of the virtual camera based on the dense depth data projected onto the input image.

In one embodiment, the generating, by the controller, dense depth data for the desired pose of the virtual camera includes minimizing, by the controller, a direction cost function to estimate a depth of a pixel.

In another embodiment, the minimizing, by the controller, the direction cost function to estimate a depth of a pixel is executed for each output pixel of each of one or more output epipolar lines of the output image.

In another embodiment, the method further includes, when the depth sensor is a dense depth sensor, assigning, by the depth sensor, depth information to pixels of the input image, and resampling, by the controller, the depth data of the pixels of the input image in epipolar coordinates.

In another embodiment, the method further includes, when the depth sensor is a sparse depth sensor, building a look-up table and mapping epipolar lines of the output image to sets of point clouds near corresponding epipolar lines of the depth sensor.

In another embodiment, the method further includes minimizing, by the controller, a direction cost function over a set of relevant points of the point cloud. Preferably, the point clouds are converted into a dense depth map by triangulation or Voronoi tessellation.

In another embodiment, the direction cost function is defined as $$DC(\vec{p}, m) = 1 - \left(\frac{\vec{p} \cdot (\vec{R}[m] + \vec{T})}{\|\vec{R}[m] + \vec{T}\|}\right)^2$$

and the minimizing the direction cost function is done in accordance with $$\tilde{m}[\vec{p}] = \mathrm{argmin}[DC(\vec{p}, m)]$$

wherein:
DC is the direction cost function;
m is a pixel along an input epipolar line of the depth data captured by the depth sensor;
$\vec{p}$ is a unit vector from a virtual camera center pointing in a direction of a pixel on the output epipolar line of the virtual camera, for which a corresponding physical pixel m along the input epipolar line of the physical camera is to be identified;
$\vec{T}$ is a vector between a physical camera center and the virtual camera center;

$\vec{R}[m]$ is a 3D point location corresponding to pixel m;
$\tilde{m}[\vec{p}]$ is a physical pixel on the input epipolar line corresponding to the minimal value of DC for given $\vec{p}$.

A system for generating a virtual view of a virtual camera based on an input scene is provided. The system includes a capturing device with a physical camera and a depth sensor, and a controller. The capturing device is configured for capturing the input scene. The controller is configured to determine an actual pose of the capturing device, to determine a desired pose of the virtual camera for showing the virtual view, to define an epipolar geometry between the actual pose of the capturing device and the desired pose of the virtual camera, and to generate an output image for the virtual camera based on an epipolar relation between the actual pose of the capturing device, the input scene, and the desired pose of the virtual camera.

Preferably, the system is configured to implement the functions described above with reference to the embodiments of the method. In particular, the system is configured to implement the steps described with respect to the embodiments in which the physical camera and the depth sensor are co-located, and the steps described with respect to the embodiments in which the physical camera and the depth sensor are spatially separated.

In one embodiment, the physical camera and the depth sensor of the capturing device are co-located.

In one embodiment, the physical camera and the depth sensor are spatially separated, e.g., spaced apart from each other.

A vehicle is provided that includes a system for generating a virtual view of a virtual camera based on an input scene. The system includes a capturing device with a physical camera and a depth sensor, and a controller. The capturing device is configured for capturing the input scene. The controller is configured to determine an actual pose of the capturing device, to determine a desired pose of the virtual camera for showing the virtual view, to define an epipolar geometry between the actual pose of the capturing device and the desired pose of the virtual camera, and to generate an output image for the virtual camera based on an epipolar relation between the actual pose of the capturing device, the input scene, and the desired pose of the virtual camera.

Preferably, the system included in the vehicle is the system described with reference to one of the embodiments above.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
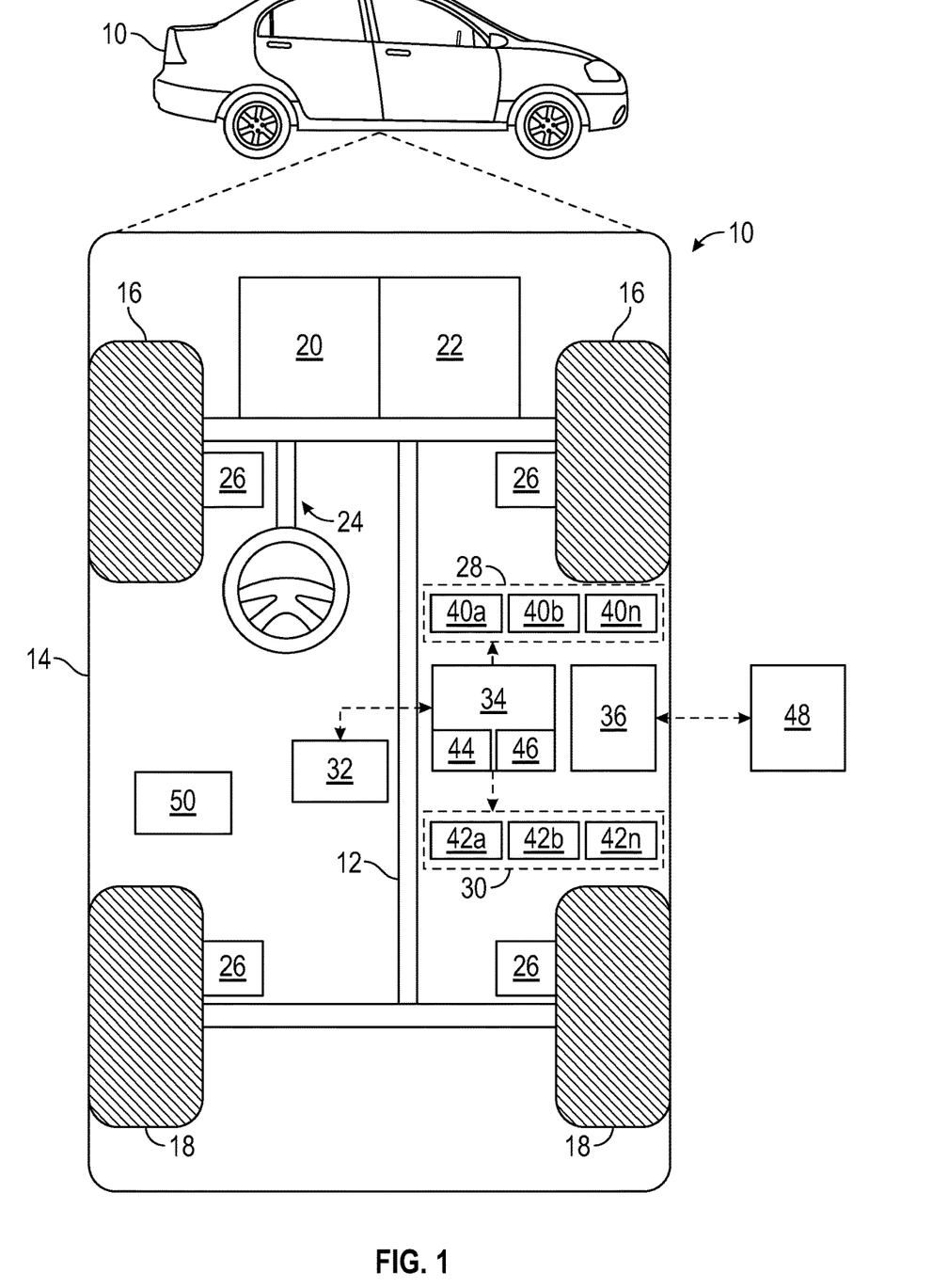
FIG. 1 is a schematic illustration of a vehicle with a controller implementing functions for generating a virtual view.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle is an automation system of Level Two or higher. A Level Two automation system indicates "partial automation". However, in other embodiments, the autonomous vehicle may be a so-called Level Three, Level Four or Level Five automation system. A Level Three automation system indicates conditional automation. A Level Four system indicates "high automation", referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for generating a virtual view and using epipolar reprojection for virtual view perspective change as described in this document for assisting a driver of the vehicle 10.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
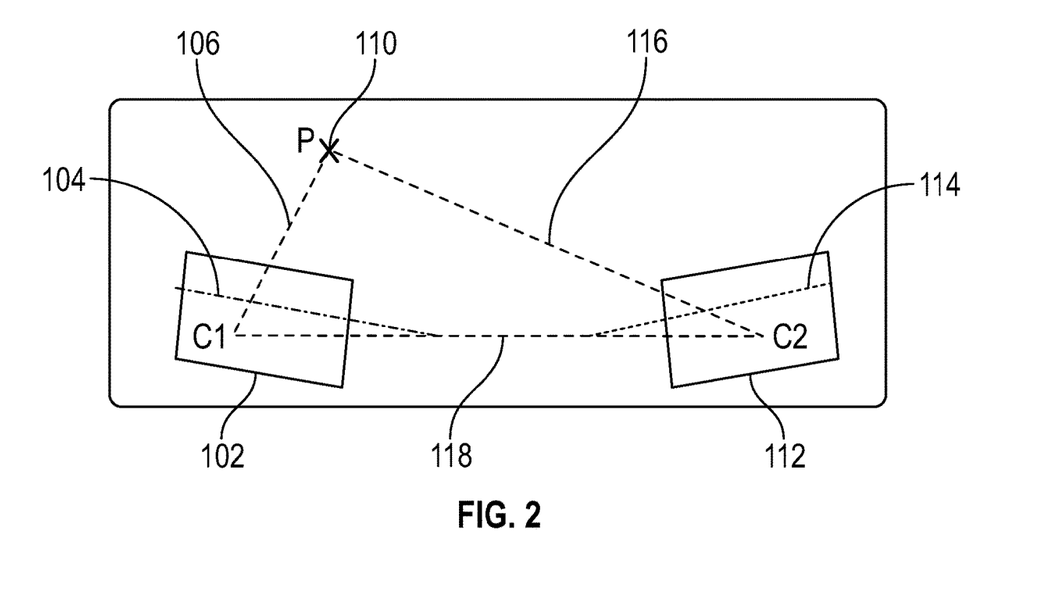
FIG. 2 is a schematic illustration of the principles of epipolar geometry with reference to two cameras.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Generally, in accordance with an embodiment, the vehicle 10 includes a controller 34 that implements a method for generating a virtual view of a virtual camera based on an input scene captured by a capturing device. The capturing device includes, for example, a physical camera and a depth sensor. One of the sensing devices 40a to 40n is an optical camera and another one of these sensing devices 40a to 40n is a physical depth sensor (like lidar, radar, ultrasonic sensor, or the like).

The vehicle 10 is designed to execute a method for generating a virtual view of a scene captured by a physical camera 40a with a co-located or spatially separated depth sensor 40b.

In one embodiment, the method for generating a virtual view of a virtual camera based on an input scene includes the steps: capturing, by a capturing device that includes a physical camera 40a and a depth sensor 40b, the input scene; determining, by a controller 34, an actual pose of the capturing device; determining, by the controller 34, a desired pose of the virtual camera for showing the virtual view; defining, by the controller 34, an epipolar geometry between the actual pose of the capturing device and the desired pose of the virtual camera; generating, by the controller 34, an output image for the virtual camera based on an epipolar relation between the actual pose of the capturing device, the input scene, and the desired pose of the virtual camera.

In one embodiment, the method includes the steps capturing the input scene by a physical camera 40a with a co-located depth sensor 40b; wherein the capturing, by the capturing device, the input scene comprises capturing, by the physical camera 40a, an input image assigning, by the depth sensor 40b, depth information to pixels of the input image; wherein the determining, by the controller 34, the actual pose of the capturing device includes determining, by the controller 34, an actual pose of the physical camera 40a; wherein the defining, by the controller 34, the epipolar geometry between the actual pose of the capturing device and the desired pose of the virtual camera includes defining, by the controller 34, the epipolar geometry between the actual pose of the physical camera 40a and the desired pose of the virtual camera; and wherein the generating, by the controller, the output image for the virtual camera comprises: resampling, by the controller 34, the depth information of the pixels of the input image in epipolar coordinates; identifying, by the controller 34, target pixels on an input epipolar line of the physical camera; generating, by the controller 34, a disparity map for one or more output epipolar lines of the virtual camera; and generating, by the controller 34, the output image based on the one or more output epipolar lines. The vehicle 10 includes a display 50 for displaying the output image to a user or occupant of the vehicle 10. It is noted that the poses of the sensors may be measured or estimated by specific pose measurement arrangements or pose estimation modules. The controller 34 as described herein obtains the poses of the physical camera and/or of the depth sensor from these pose measurement arrangements or pose estimation modules, i.e., determines the pose by reading or obtaining the specific pose value, and uses the determined pose value for the steps of the method described herein.

The input image is captured by a physical camera 40a, e.g., an optical camera that is configured to capture color pictures of the environment. The physical camera 40a is arranged at the vehicle 10 so that it can cover a certain field of view of the vehicle's surroundings. Depth information are assigned to the pixels of the input image in order to obtain or estimate the distance between the physical camera 40a and an object that is represented by the pixels of the input image. Depth information may be assigned to each pixel of the input image, by a dense or sparse depth sensor or by a module that is configured to determine the depth based on image information.

The desired view location and view direction of the virtual camera 40a may be referred to as the desired perspective of the virtual camera. In addition thereto, intrinsic calibration parameters of the virtual camera may be given to determine the field of view, the resolution, and optionally or additionally other parameters of the virtual camera. The desired perspective may be a perspective as defined by a user of a vehicle. Thus, the user or occupant of a vehicle may choose a perspective of the virtual camera onto the vehicle's surroundings.

The desired pose of the virtual camera may include the view location and view direction with respect to a reference point or reference frame, e.g., the view location and view direction of the virtual camera with respect to a vehicle. The desired pose is a virtual point where a user wants a virtual camera to be located including the direction into which the virtual camera points. The desired pose may be changed by a user of a vehicle to generate a virtual view of the vehicle and its environment from different view locations and for different view directions.

The actual pose of the physical camera is determined to have information about the perspective from which the input image is captured.

The depth sensor 40b may be a physical depth sensor or a module (may be called virtual depth sensor) that assigns depth information to a pixel or an object of the input image based on image information. Examples for a physical depth sensor are ultrasonic sensors, radar sensors, lidar sensors, or the like. These sensors are configured to determine a distance to a physical object. The distance information determined by the physical depth sensors are then assigned to the pixels of the input image. A so-called virtual depth sensor determines or estimates depth information based on the image information. To generate an appropriate output image for the pose of the virtual camera, it might be sufficient if the depth information provided by the virtual depth sensor are consistent. It is not necessarily required that the depth information is absolutely accurate.

In another embodiment, the method includes capturing the input scene by a physical camera and by a depth sensor that is spatially separated from the physical camera. The capturing, by the capturing device, the input scene includes capturing, by the physical camera 40a, an input image, and capturing, by the depth sensor 40b, depth data related to the input image; the determining, by the controller, the actual pose of the capturing device includes determining, by the controller 34, an actual pose of the physical camera 40a, and determining, by the controller 34, an actual pose of the depth sensor 40b; the defining, by the controller, the epipolar geometry between the actual pose of the capturing device and the desired pose of the virtual camera includes defining, by the controller 34, the epipolar geometry between the actual pose of the depth sensor 40b and the desired pose of the virtual camera; and the generating, by the controller, the output image for the virtual camera includes: generating, by the controller 34, dense depth data for the desired pose of the virtual camera; projecting, by the controller 34, the dense depth data for the desired pose of the virtual camera onto the input image; and generating, by the controller 34, the output image of the virtual camera based on the dense depth data projected onto the input image.

In this embodiment, the input image is captured by a physical camera 40a, e.g., an optical camera that is configured to capture color pictures of the environment. Depth data are captured by a physical depth sensor 40b that is spaced apart from the physical camera 40a, i.e., the input image and the depth data are captured by sensors that are located at different positions and have different perspectives onto a scene. Dense depth data for the pose of the virtual camera is generated by the controller, i.e., the objects that are visible from the desired position of the virtual camera are assigned with depth information to obtain the distance of the objects that are captured by the physical camera from the virtual camera. The dense depth data are applied to the input image so that the objects shown in the input image are assigned a depth information with respect to the virtual camera.

Generally, the depth sensor 40b may be a sparse depth sensor or a dense depth sensor. A sparse depth sensor provides depth information for some pixels and regions of the input image, but not for all pixels. A sparse depth sensor does not provide a continuous depth map. A dense depth sensor provides depth information for every pixel of the input image. When the depth sensor is a dense depth sensor, reprojection of depth values onto the image of the virtual camera is performed as in the embodiment with the co-located depth sensor.

FIG. 1 generally shows a vehicle 10 that includes a system for generating a virtual view of a virtual camera based on an input scene. The system includes a physical camera 40a, a depth sensor 40b (either co-located with the physical camera or spatially separated therefrom), and a controller 34. The system is configured to execute the steps of both methods described herein.

FIG. 2 exemplarily shows the principles of the epipolar geometry with reference to a first camera 102 with the camera center C1 and a second camera 112 with the camera center C2. A first epipolar line 104 is defined in the first camera 102. A ray 106 defines the position of the pixel P (indicated with 110) on the epipolar line 104. The position of the same pixel P 110 is also defined on epipolar line 114 by ray 116 that extends from the camera center C2 of the second camera 112 to the pixel P. Reference sign 118 is a vector between the two camera centers C1 and C2. Given the vector 118 and the known position of pixel P on the epipolar line 104 as well as the distance between the camera center C1 and pixel P, the position of pixel P on the epipolar line 114 can be determined. With this underlying principle, the scene captured by the first camera 102 can be used to calculate a scene as it would be observed with the second camera 112. The virtual position of the second camera 112 can be varied. Consequently, the position of the pixels on the epipolar line 114 also varies when the position of the second camera 112 is varied. In various embodiments described herein, a virtual view perspective change is enabled. This virtual view perspective change may be advantageously used for generating surround views and for trailering applications. Using the epipolar geometry for generating the virtual view considers the three-dimensional nature of the environment of a vehicle, particularly by considering the depth of a pixel P (distance between pixel P and camera center C1 of the first camera 102) when generating the virtual view of the second camera 112.

In various embodiments, the method includes: using a depth-assisted epipolar reprojection by defining an epipolar geometry between the desired view location and position (second camera 112) and the depth sensor pose of the first camera 102, finding a disparity along the epipolar line for each output pixel of the image to be generated by the virtual camera by minimizing a direction cost function, and generating an output image by fetching pixels at calculated disparities. It is noted that the disparity relates to the difference between a pixel's position on cameras which are located at different positions. The disparity is connected to the distance between an object and the camera at different positions. The greater this distance is, the smaller is the disparity of an object or the pixels representing that object.

Figure 3:
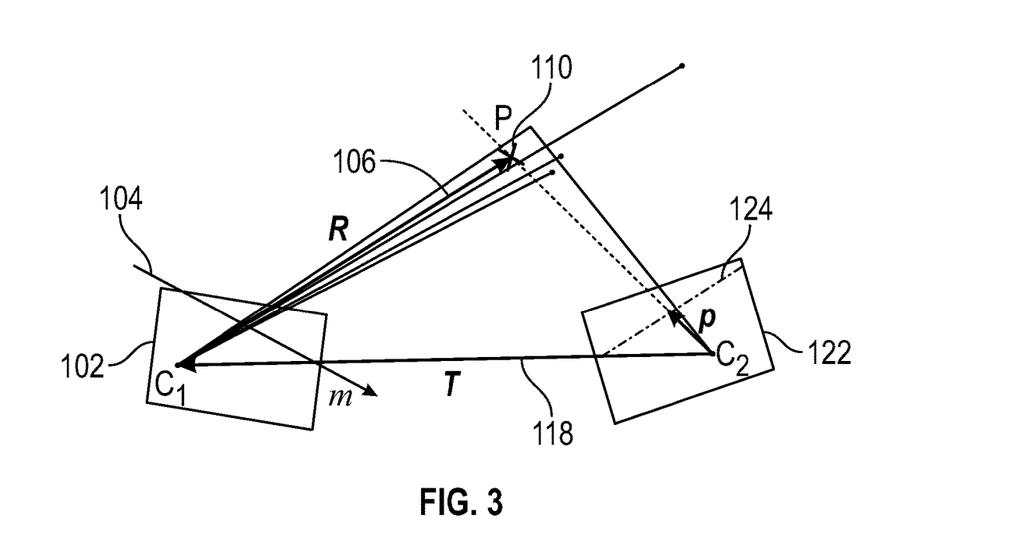
FIG. 3 is a schematic illustration of epipolar reprojection of a pixel in accordance with a first embodiment.

FIG. 3 schematically shows the basic relation of FIG. 2 as applied to a specific use case with a virtual camera 122. The first camera 102 with the first epipolar line 104 is used to capture an environment. Multiple pixels P and their position along the epipolar line 104 as well as the distance of the pixels from the camera center C1 are captured by the first camera 102. A ray R 106 indicates the position of a pixel P 110 along the epipolar line 104. With the known distance between the camera center C1 and the pixel P as well with the vector T 118 between the center C1 of the physical camera and the center C2 of the virtual camera 122, the position of the pixel P 110 on the epipolar line 124 of the virtual camera 122 can be determined.

In FIG. 3, $\vec{p}$ is the unit vector from the virtual camera 112 center C2 pointing in the direction of the Pixel 110 on the epipolar line 124 for which a corresponding pixel m on the epipolar line 104 of the physical camera is to be identified. $\vec{T}$ is the vector between the camera centers C1 and C2. $\vec{R}[m]$ is the 3D point location corresponding to pixel m. $\tilde{m}[\vec{p}]$ is the physical pixel on the epipolar line 104 corresponding to the minimal value of the direction cost function for given $\vec{p}$, with the direction cost being determined as $$DC(\vec{p}, m) = 1 - \left( \frac{\vec{p} \cdot (\vec{R}[m] + \vec{T})}{\|\vec{R}[m] + \vec{T}\|} \right)^2$$

and the minimum value thereof being determined as $$\tilde{m}[\vec{p}] = \operatorname{argmin}[DC(\vec{p}, m)]$$

Figure 4:
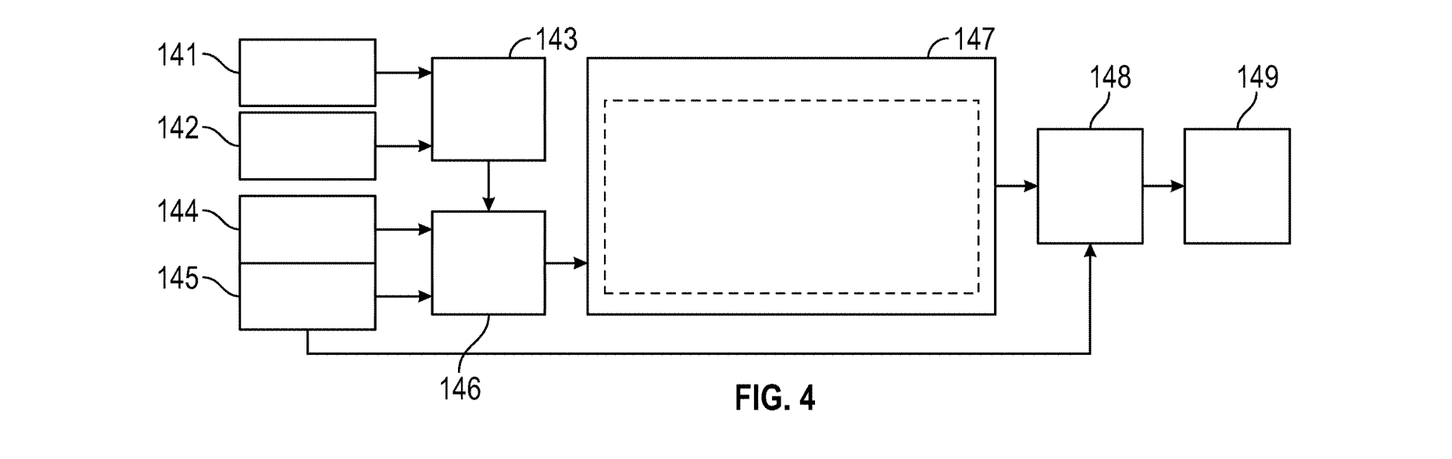
FIG. 4 is a schematic illustration of a method for generating a virtual view in accordance with the first embodiment.

FIG. 4 schematically shows a first embodiment of the method for generating a virtual view of a scene captured by a physical camera with a co-located depth sensor. At 141, viewpoint pose data (location and direction of the virtual camera 122) are captured. This information may be chosen by a user or occupant of the vehicle 10 and corresponds to the desired position of the virtual camera for viewing the surrounding scene. At 142, input camera 102 pose data are acquired. It is noted that at 141 and 142, intrinsic calibration parameters of the viewpoint pose data and/or of the input camera pose data may preferably be acquired. For example, the intrinsic parameters of a perspective camera typically include focal distance, principal point, distortion model, etc. The input camera 102 pose data and the desired pose data of the virtual camera 122 are used at 143 to define an epipolar geometry between the physical camera (i.e., input camera) 102 and the virtual camera 122. For defining the epipolar geometry, the intrinsic calibration parameters of the viewpoint poise data and/or of the input camera may be used. At 144, an input depth map including depth information of an input image (received from the physical camera) is received and at 145, the input image is received. Based on the epipolar geometry that is generated at 143, the input depth map of 144 and the input image of 145 are resampled in epipolar coordinates at 146. At 147, the direction cost is minimized for each output pixel and for each output epipolar line (of the output image of the virtual camera) to find target pixel(s) on the corresponding input epipolar line. Then, at 148, a disparity map is created which is the basis for generating the output image at 149 to be shown by the virtual camera. The steps shown in FIG. 4 are preferably used for generating an output image of a virtual camera based on an input image of a physical camera with a co-located depth sensor or a depth-from-mono-module that provides depth information based on an input image.

FIG. 3 and the related description point out how the epipolar reprojection is done for a depth sensor that is co-located with the physical (input) camera. The epipolar geometry is defined between the input physical camera 102 and the virtual camera 122 at a desired location and viewing direction, and the direction cost is minimized for each output pixel to find the output pixel disparity.

Figure 5:
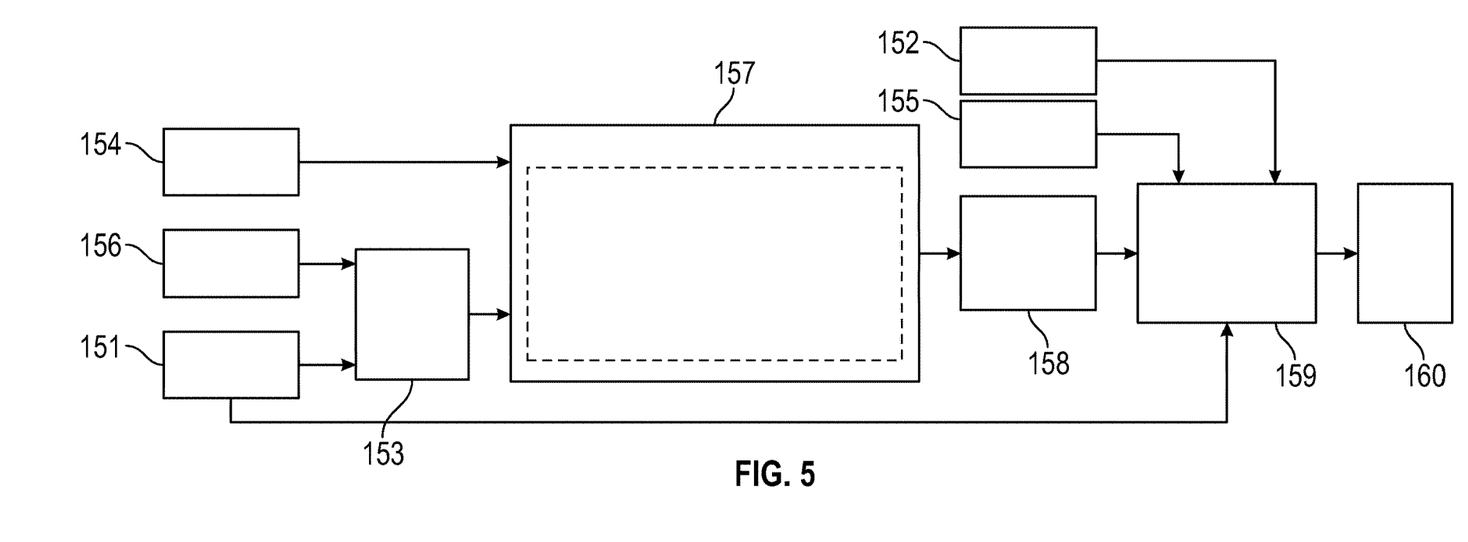
FIG. 5 is a schematic illustration of a method for generating a virtual view in accordance with a second embodiment.

FIG. 5 schematically shows a second embodiment of the method for generating a virtual view of a scene captured by a physical camera with a spatially separated depth sensor. The epipolar geometry is defined at 153 based on the viewpoint pose data of the virtual camera (as desired or chosen by a user) retrieved at 151 and the depth sensor pose data retrieved at 156 from a physical depth sensor that is spatially separated from the physical camera. At 151 and 156, intrinsic calibration parameters of the viewpoint pose data and/or of the depth sensor pose data may preferably be acquired. The intrinsic calibration parameters of the viewpoint pose data and/or of the depth sensor pose data may then be used to define the epipolar geometry. The epipolar geometry defined at 153 and the input depth data retrieved at 154 from the depth sensor are used to minimize direction cost for each output pixel for each output epipolar line at 157 to estimate the depth of the output pixel. Based on the minimized direction cost, dense depth data for the viewing point of the virtual camera are generated at 158. The dense depth data generated at 158, the input camera pose data retrieved at 152 (location and direction of the physical camera), and the input image 155 retrieved at 155 are used at 159 to project the dense depth data on the input camera and to find target pixel(s) that are used at 160 to generate the output image for the virtual camera. At 152, intrinsic calibration parameters of the input camera pose data may preferably be acquired. For example, the intrinsic parameters of a perspective camera typically include focal distance, principal point, distortion model, etc.

Figure 6:
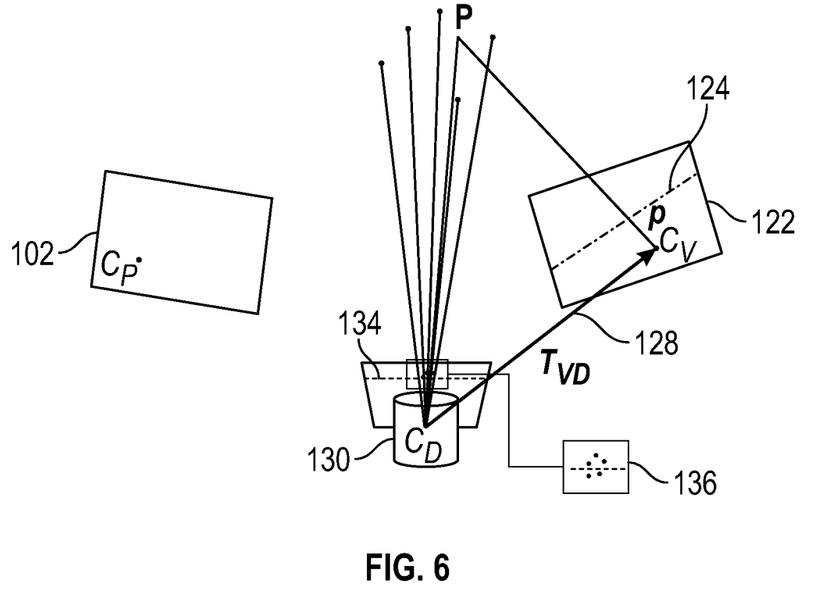
FIG. 6 is a schematic illustration of epipolar reprojection of a pixel in accordance with the second embodiment.
Figure 7:
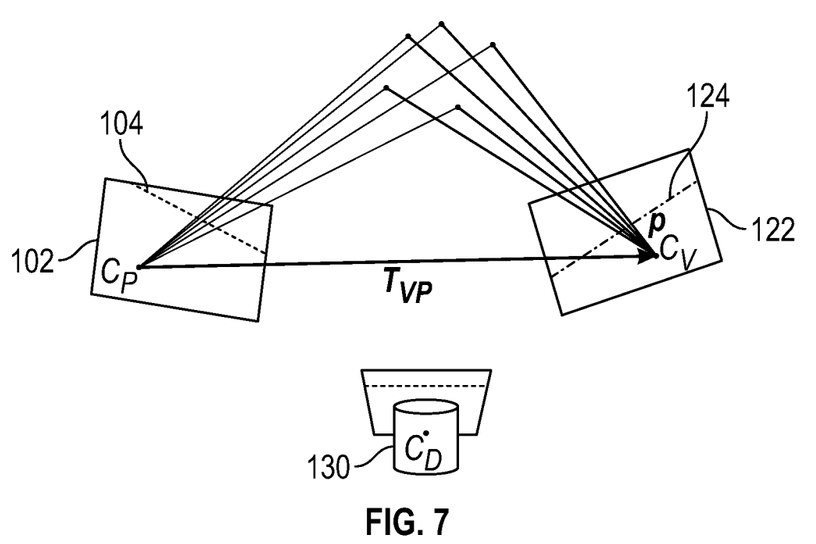
FIG. 7 is a schematic illustration of epipolar reprojection of a pixel in accordance with the second embodiment.

FIG. 6 and FIG. 7 describe the process of FIG. 5 with reference to an input physical camera 102 (with the center Cp), a virtual camera 122 (with the center Cv), and a depth sensor 130 (with the center CD) that is spatially separated from the physical camera 102 and located at a different position and spaced apart from the physical camera 102.

Initially, an epipolar geometry is defined between the depth sensor 130 and the virtual camera 122. The depth sensor 130 determines depth data 136 (shown for a set of point cloud points) for different points in the field of view of the depth sensor 130. The epipolar geometry is defined as described with reference to FIG. 3. However, in FIG. 6, an epipolar line 134 of the depth sensor, an epipolar line 124 of the virtual camera, and a vector 128 between the center CD of the depth sensor 130 and the center Cv of the virtual camera 122 are used to define the epipolar geometry. If the depth sensor 130 is dense, the epipolar reprojection of depth values onto the virtual camera is performed as described with reference to FIG. 3 and FIG. 4. If the depth sensor is sparse, a lookup table is built mapping virtual camera epipolar lines to sets of point cloud points near the corresponding epipolar line of the depth sensor. For each output pixel, the direction cost is minimized over the set of relevant point cloud points. A dense virtual camera depth map is projected onto the input image of the physical camera to find corresponding input pixel(s) and assign depth information to the input pixel(s), as shown in FIG. 7. To speed up procedure, sparse point clouds can be converted into a dense depth map by triangulation or Voronoi tessellation. The dense depth map can then be used for epipolar reprojection of depth values onto the virtual camera as described above.

It will be appreciated that the controller 34 of vehicle 10 implements the functions as described with reference to FIG. 3 to FIG. 7 while the sensors of the vehicle 10 provide the required information, i.e., a physical camera provides the input image and a depth sensor, be it a co-located or spatially separated depth sensor, provides the depth information. The depth information may be obtained from the input image by so-called depth-from-mono-techniques.

Occlusions of objects in the captured scene may occur following a perspective change due to a true representation of the three dimensional structure of the scene. Generally, occlusion detection is not part of epipolar reprojection per so. However, occluded regions are typically characterized by very high values of direction cost function and thus can be detected. In addition to pure direction term, the cost function can be regularized by including so-called data smoothness terms consisting of, for example, a sum of color differences over neighboring pixels in the output image. Preferably, nearest-neighbor interpolation is used (equivalent to integer values of optimal disparity) to avoid generating false slopes over large depth differences. However, for sparse data, more complex interpolation modules may be used, depending on depth differences.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating a virtual view of a virtual camera based on an input scene, the method comprising:
   capturing, by a capturing device, input scene data, wherein the capturing device comprises a physical camera and a depth sensor that is spatially separated from the physical camera, wherein the input scene data includes an input image and depth data related to the input image;
   determining, by a controller, an actual pose of the physical camera and the depth sensor;
   determining, by the controller, a desired pose of the virtual camera for showing the virtual view;
   defining, by the controller, an epipolar geometry between the actual pose of the the depth sensor and the desired pose of the virtual camera;
   generating, by the controller, an output image for the virtual camera based on an epipolar relation between the actual pose of the the depth sensor, the input scene data, and the desired pose of the virtual camera.

2. The method of claim 1,
   wherein the generating, by the controller, the output image for the virtual camera comprises:
   generating, by the controller, dense depth data for the desired pose of the virtual camera;
   projecting, by the controller, the dense depth data for the desired pose of the virtual camera onto the input image; and
   generating, by the controller, the output image of the virtual camera based on the dense depth data projected onto the input image.

3. The method of claim 2,
   wherein the generating, by the controller, dense depth data for the desired pose of the virtual camera comprises:
   minimizing, by the controller, a direction cost function to estimate a depth of a pixel.

4. The method of claim 3,
   wherein the minimizing, by the controller, the direction cost function to estimate a depth of a pixel is executed for each output pixel of each of one or more output epipolar lines of the output image.

5. The method of claim 3,
   wherein the direction cost function is defined as $$DC(\vec{p}, m) = 1 - \left( \frac{\vec{p} \cdot (\vec{R}[m] + \vec{T})}{\|\vec{R}[m] + \vec{T}\|} \right)^2$$

and the minimizing the direction cost function is done in accordance with $$\tilde{m}[\vec{p}] = \mathrm{argmin}[DC(\vec{p}, m)]$$

wherein:
DC is the direction cost function;
m is a pixel along an input epipolar line of the depth data captured by the depth sensor;
$\vec{p}$ is a unit vector from a virtual camera center pointing in a direction of a pixel on the output epipolar line of the virtual camera, for which a corresponding physical pixel m along the input epipolar line of the physical camera is to be identified;
$\vec{T}$ is a vector between a physical camera center and the virtual camera center;
$\vec{R}[m]$ is a 3D point location corresponding to pixel m;
$\tilde{m}[\vec{p}]$ is a physical pixel on the input epipolar line corresponding to a minimal value of DC for given $\vec{p}$.

6. The method of claim 2, further comprising:
   when the depth sensor is a dense depth sensor, assigning, by the depth sensor, depth information to pixels of the input image, and resampling, by the controller, the depth data of the pixels of the input image in epipolar coordinates.

7. The method of claim 2, further comprising:
   when the depth sensor is a sparse depth sensor, building a look-up table and mapping epipolar lines of the output image to sets of point clouds near corresponding epipolar lines of the depth sensor.

8. The method of claim 7, further comprising:
   minimizing, by the controller, a direction cost function over a set of relevant points of the point cloud.

9. A system for generating a virtual view of a virtual camera based on an input scene, the system comprising:
   a capturing device with a physical camera and a depth sensor that is spatially separated from the physical camera, configured for capturing input scene data, wherein the input scene data includes an input image and depth data related to the input image;
   a controller, configured to determine an actual pose of the physical camera and an actual pose of the depth sensor;

wherein the controller is configured to determine a desired pose of the virtual camera for showing the virtual view;

wherein the controller is configured to define an epipolar geometry between the actual pose of the physical camera and the actual pose of the depth sensor and the desired pose of the virtual camera;

wherein the controller is configured to generate an output image for the virtual camera based on an epipolar relation between the actual pose of the physical camera and the actual pose of the depth sensor, the input scene data, and the desired pose of the virtual camera.

10. The system of claim 9, wherein the controller is configured to generate the output image for the virtual camera by:

generating dense depth data for the desired pose of the virtual camera;

projecting the dense depth data for the desired pose of the virtual camera onto the input image; and generating the output image of the virtual camera based on the dense depth data projected onto the input image.

11. The system of claim 10, wherein the controller is configured to generate the dense depth data for the desired pose of the virtual camera by minimizing a direction cost function to estimate a depth of a pixel.

12. The system of claim 11, wherein the controller is configured to minimize the direction cost function to estimate a depth of a pixel is executed for each output pixel of each of one or more output epipolar lines of the output image.

13. The system of claim 10, wherein the controller is further configured to, when the depth sensor is a dense depth sensor, assign depth information to pixels of the input image, and resample the depth data of the pixels of the input image in epipolar coordinates.

14. The system of claim 10, wherein the controller is further configured to, when the depth sensor is a sparse depth sensor, build a look-up table and map epipolar lines of the output image to sets of point clouds near corresponding epipolar lines of the depth sensor.

15. The system of claim 14, wherein the controller is further configured to, minimize a direction cost function over a set of relevant points of the point cloud.

16. The system of claim 10, wherein the direction cost function is defined as $$DC(\vec{p}, m) = 1 - \left(\frac{\vec{p} \cdot (\vec{R}[m] + \vec{T})}{\|\vec{R}[m] + \vec{T}\|}\right)^2$$

and the minimizing the direction cost function is done in accordance with $$\tilde{m}[\vec{p}] = \mathrm{argmin}[DC(\vec{p}, m)]$$

wherein:

DC is the direction cost function;

m is a pixel along an input epipolar line of the depth data captured by the depth sensor;

$\vec{p}$ is a unit vector from a virtual camera center pointing in a direction of a pixel on the output epipolar line of the virtual camera, for which a corresponding physical pixel m along the input epipolar line of the physical camera is to be identified;

$\vec{T}$ is a vector between a physical camera center and the virtual camera center;

$\vec{R}[m]$ is a 3D point location corresponding to pixel m;

$\tilde{m}[\vec{p}]$ is a physical pixel on the input epipolar line corresponding to a minimal value of DC for given $\vec{p}$.

17. A vehicle, comprising a system for generating a virtual view of a virtual camera based on an input scene, the system comprising:

a capturing device with a physical camera and a depth sensor that is spatially separated from the physical camera, configured for capturing input scene data, wherein the input scene data includes an input image and depth data related to the input image;

a controller, configured to determine an actual pose of the physical camera and an actual pose of the depth sensor;

wherein the controller is configured to determine a desired pose of the virtual camera for showing the virtual view;

wherein the controller is configured to define an epipolar geometry between the actual pose of the physical camera and the actual pose of the depth sensor and the desired pose of the virtual camera;

wherein the controller is configured to generate an output image for the virtual camera based on an epipolar relation between the actual pose of the physical camera and the actual pose of the depth sensor, the input scene data, and the desired pose of the virtual camera.

18. The vehicle of claim 17, wherein the controller is configured to generate the output image for the virtual camera by:

generating dense depth data for the desired pose of the virtual camera;

projecting the dense depth data for the desired pose of the virtual camera onto the input image; and generating the output image of the virtual camera based on the dense depth data projected onto the input image.

19. The vehicle of claim 18, wherein the controller is configured to generate the dense depth data for the desired pose of the virtual camera by minimizing a direction cost function to estimate a depth of a pixel.

20. The vehicle of claim 19, wherein the controller is configured to minimize the direction cost function to estimate a depth of a pixel is executed for each output pixel of each of one or more output epipolar lines of the output image.

* * * * *